COMPENSATED PULSE WIDTH DEMODULATOR
Filed Nov. 3, 1961
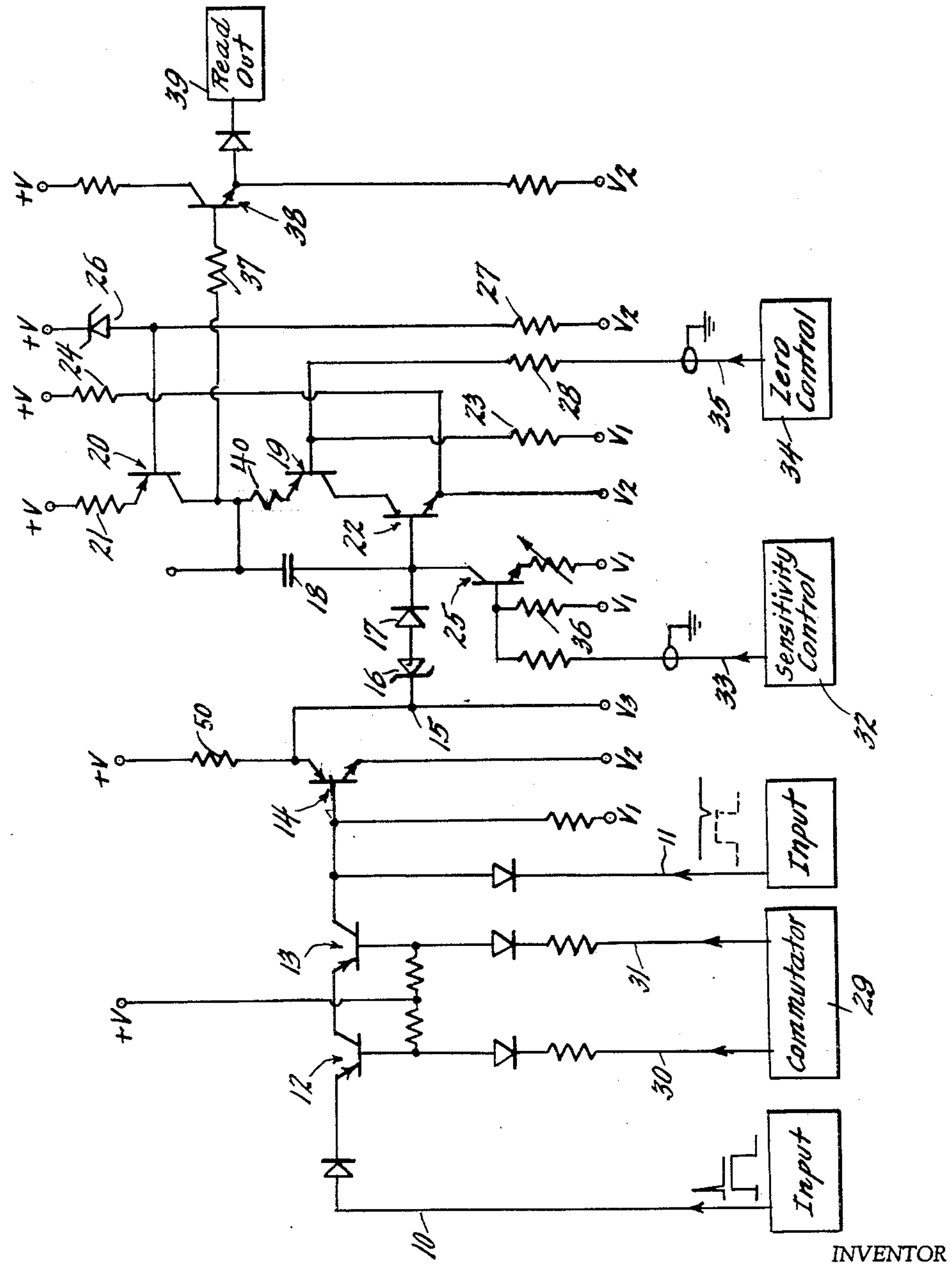
INVENTOR
Neil E. Maestre,
BY Paris, Haskell and Levine
ATTORNEYS United States Patent Office 3,129,385
Patented Apr. 14, 1964

3,129,385

COMPENSATED PULSE WIDTH DEMODULATOR

Neil E. Maestre, Levittown, N.J., assignor to Vector Manufacturing Company, Incorporated, a corporation of Pennsylvania Filed Nov. 3, 1961, Ser. No. 150,066
9 Claims. (Cl. 325—38)

The invention generally relates to improvements in pulse demodulators and is particularly concerned with a device for converting pulse width or time intervals into a direct current voltage signal for use in decoding telemetered information, time measurement or the like.

Very generally according to the invention there is provided an improved circuit for accurately translating pulses of variable width or variable time duration into a direct current signal voltage. The invention employs the principle of linearly charging a capacitor for a time interval accurately controlled by the width of the pulse. Various circuits for performing this function have been heretofore known in the art but are not considered completely satisfactory for a number of reasons. Initially, for purposes of accuracy as required in the telemetering field, the capacitor charging circuits must provide a precise linear rate of charging the capacitor, and according to the prior art teaching, the circuitry previously evolved for this purpose has been rather detailed and complex, requiring elaborate electron tube circuits. Additionally, for information decoding purposes, the capacitor charging rate and initial charge maintained on the capacitor must be independently variable which in turn has heretofore necessitated a considerable increase in the number of components, and in the complexity of the circuits employed.

It is accordingly a principal object of the invention to provide a precision pulse width demodulator circuit having fewer components and reduced complexity.

A further object of the invention is to provide such a circuit adapted for transistors and solid state elements instead of vacuum tubes and therefore permitting a considerable reduction in the size, weight and power consumption of the equipment.

A still further object is to provide such a demodulator in which the ratio of direct current signal output to the pulse or time duration may be controllably varied and wherein the direct current output voltage at zero input time duration may be independently varied.

Other objects and additional advantages will be more readily understood after a detailed consideration of the following specification and drawing wherein:

FIG. 1 is an electrical schematic drawing illustrating one preferred embodiment of the invention.

Referring now to the drawing, there is illustrated the preferred demodulator circuitry of one channel of a multiple channel telemetering system. Each of these channels are adapted to be successively switched into operation by a commutator mechanism indicated at 29, thereby to select a given pulse from a series of such pulses and translate its duration or time into a direct current potential provided at the read-out 39. The width of the input pulse is directly proportional to a quantity originally detected at a remotely located source whereby the amplitude of the direct current potential at the readout 39 likewise provides an accurate measure of the remotely detected quantity.

According to the invention, each of the incoming duration modulated pulses is initially differentiated to provide a sharp edged positive trigger pulse at the leading edge thereto that is directed over an input line 10 and a sharp edged negative trigger pulse at the trailing edge thereof being directed over a second input line 11, with the time interval between the leading edge trigger and trailing edge trigger being accurately proportional to the pulse width or time duration to be determined.

The leading edge trigger pulse passes over input line 10 and through the emitter collector junctions of series connected switch transistors 12 and 13, which together function as a gate circuit, and is applied to the base electrode 14 of a switching transistor 14. The commutator mechanism 29 simultaneously produces pulses over lines 30 and 31 to jointly render both switch transistors 12 and 13 conductive thereby to select or commutate the proper incoming pulse for that channel.

The transistor 14 is preferably of a variety known in the art as a transwitch and being characterized by being rendered continuously conductive upon the application of a positive pulse at its base electrode and being extinguished upon a negative pulse received at its base electrode. The transwitch 14 is normally biased in a nonconducting condition and upon receiving the positive trigger pulse, it is rendered continuously conductive. Upon becoming conductive, the voltage potential at point 15 in the circuit, being connected between the upper electrode of transwitch 14 and series resistor 50, immediately drops to a low potential and the potential at the base electrode of transistor 22 likewise immediately drops to a low potential due to the functioning of a Zener type diode 16, which as is well known in the art may comprise a breakdown diode, such as a silicon regulator diode, and a unilateral diode 17 that provides a one-way series interconnection of terminal 15 with the base of transistor 22.

The transistor 22 is connected in parallel arrangement with a storage capacitor 18 across a constant current charging source and is normally conducting to by-pass substantially all of the charging current from passing through to the capacitor 18. However, upon receiving the negative going pulse at its base electrode, the transistor 22 is immediately switched to a nonconducting condition, thereby permitting the constant current flow to commence linearly charging the capacitor 18.

The linear charging of capacitor 18 continues until a negative trigger pulse in received over line 11, signifying the end of the duration to be measured, which trigger pulse immediately extinguishes the transwitch 14, thereby rapidly raising the potential at terminal 15 and switching a positive potential to the base of transistor 22 to again switch transistor 22 into its conducting condition. This diverts the constant charging current through transistor 22 and prevents further charging of capacitor 18. Additionally, the capacitor 18 discharges through a transistor 19 and through the collector-emitter junction of transistor 22 to be restored to its original potential. At the end of the measured time interval, therefore, the voltage stored on capacitor 18 is accurately proportional to the time interval of charging the capacitor and therefore to the duration of the original width modulated pulse which produces the positive and negative trigger pulses. Since the current charging the capacitor 18 is constant with time, the charge or potential appearing across the capacitor 18 is in the form of an increasing linear sawtooth wave whose amplitude is therefore accurately and directly proportional to the time interval of charging the capacitor.

The output direct current voltage appearing across capacitor 18 is directed through resistor 37 to the base electrode of transistor 38, connected in an emitter follower type amplifier circuit, and thence from the emitter of transistor 38 to a high impedance read-out circuit 39. As is well known, the emitter follower circuit provides a very high input impedance and prevents a non-linear discharging of the capacitor 18.

The preferred constant current producing circuit according to the invention comprises a transistor 20 and a large dominating resistor 21 connected in series with its collector-emitter circuit to a positive source of potential V. The base electrode of transistor 20 is energized by a constant potential appearing across a Zener diode 26, connected in a potential divider circuit with a resistor 27. The large resistor 21 in series with transistor 20 dominates the charging circuit to provide a constant current flow through transistor 20 and thence to either the capacitor 18 or through the paralleled by-pass path through transistor 22 as discussed above.

According to the invention, there is also provided an independently adjustable means for controlling the rate of charging the capacitor 18 and a second independently adjustable means for varying the initial voltage stored on the capacitor 18. Both of these variable parameters are required in telemetry applications, and the first is commonly referred to as a sensitivity control and is energized by a potential 32 and the second as a zero control being energized by a voltage potential 34.

The sensitivity control is provided by a regulating transistor 25 whose emitter-collector electrodes are connected in series circuit with the charging capacitor 18. The base electrode of transistor 25 is energized by a sensitivity control potential from 32 and the conductivity between the collector and emitter electrodes is therefore controlled by this potential. Consequently, the transistor 25 functions as a voltage controlled variable impedance in series with the capacitor 18 thereby to control the time constant of the charging circuit and hence the rate of charging of the capacitor 18. In a pulse coded telemetering system, the sensitivity control voltage 32 is originally produced at the remote location and transmitted along with the intelligence pulse (pulse duration impulses) from the remote location to the various channels as in FIG. 1. Consequently, the sensitivity control voltage functions as an error correction signal to compensate for any extraneous variation in the width or duration of the pulses as may be occasioned at the remote source or as may be introduced during transmission of the pulses from the remote source to the various receiving channels as in FIG. 1. The sensitivity control voltage received at 32, therefore, varies in the same manner as the width modulated intelligence pulses so that at the receiving channel, as in FIG. 1, the rate of charging of the capacitor 18 is controlled in such manner as to compensate for any remote source or transmission errors.

The zero control or initial voltage on the capacitor 18 is likewise adapted to be controlled or regulated from the remote station by means of a zero control signal received at the unit 34. This signal is directed upwardly through resistor 28 to the base electrode of transistor 19 whose emitter-collector electrodes are connected in series circuit relationship with transistor 22 in the by-pass path and in parallel relationship with capacitor 18. The zero control signal adjustably controls the conductivity through transistor 19 to provide, in effect, a variable impedance in this by-pass channel. The voltage drop across this variable impedance together with the voltage drop across resistor 40, which all are functions of the controlled conductivity of transistor 19 by the variable potential applied to the base, are applied in parallel directly across the charging capacitor 18. Consequently, during the initial intervals when all of the constant charging current is by-passed through the transistors 19 and 22 and resistor 40, the initial voltage on capacitor 18 is determined by the collector-emitter voltage drop across transistor 19 in additive series with the voltage drop across resistor 40 thereby establishing the zero voltage output at the read-out 39.

Although but one preferred embodiment of the invention has been illustrated and described, it is believed evident that many changes may be made by those skilled in the art without departing from the spirit and scope of the invention. Accordingly this invention should be considered as being limited only according to the following claims.

What is claimed is:

1. A pulse width demodulator circuit comprising: a transistor switch means operable at the beginning and ending of each width modulated impulse, a storage capacitor, a second switching transistor, and means including a regulating transistor in parallel circuit connection with the storage capacitor, a constant current producing means for energizing said parallel circuit, means interconnecting said first and second switching transistors to normally maintain said second transistor conducting and trigger said second transistor into nonconducting condition at the beginning of each width modulated impulse and restore said transistor into conducting condition at the end of each impulse, means including a second regulating transistor in the charging circuit to said capacitor, means responsive to a first error correcting signal to vary the conductivity of said first mentioned regulating transistor thereby to establish an initial voltage across said capacitor, and means responsive to a second error correcting signal to vary the conductivity of the second regulating transistor thereby to control the rate of charging of said capacitor.

2. In the demodulator of claim 1, a high impedance read-out circuit connected to said capacitor to transmit an output voltage proportional to the voltage stored on said capacitor.

3. In the demodulator of claim 1, said means interconnecting the first and second switching transistors including a diode and a Zener diode for rapidly triggering said second transistor into and out of a conducting condition.

4. In the demodulator of claim 1, a pulse operated control means, said control means including a pulse controlled transistor gate circuit for gating the application of selected triggering impulses to said first switching transistor at the beginning of the width modulated impulse, and conductor means for directly applying a trigger impulse to the first switching transistor at the end of each width modulated impulse.

5. In the demodulator of claim 1, said constant current producing means comprising a series connected transistor and a large dominating impedance, and a constant voltage regulating means including a Zener diode for controlling the flow of current through said transistor.

6. In a demodulator responsive to variable width impulses to be demodulated, a substantially constant current producing means, a storage capacitor connected in circuit to be linearly charged by said constant current, a signal controlled switch means in by-pass relation to said capacitor and being energizable to by-pass said constant current from charging said capacitor, an error signal controlled variable impedance in circuit with said switch means and in shunting relationship with said capacitor, error signal directing means for energizing said variable impedance to provide a variable voltage drop across said capacitor to establish an initial voltage on said capacitor proportional to said signal, a second error signal controlled variable impedance in the charging circuit of said capacitor for controlling the rate of charging said capacitor, and a second error signal directing means for energizing said second variable impedance.

7. In the demodulator of claim 6, the addition of means responsive to the leading edge of each impulse to be demodulated to produce a switching impulse, means responsive to each such switching impulse to energize said signal controlled switch means into nonconducting condition, said first mentioned means producing a switching impulse at the trailing edge of each width modulated impulse and energizing said signal controlled switch means into conducting condition.

8. In the demodulator of claim 7, a control means associated with said first mentioned means for selectively directing the leading edge of only predetermined ones of said impulses to be demodulated to said first mentioned means, said control means comprising a pair of series connected switching transistors.

9. In the demodulator circuit of claim 8, said means for producing said switching impulses comprising a control switch transistor, an impedance in a potential divider circuit, and a Zener diode connected at the junction of said control switch transistor and impedance and being rapidly responsive to the commencement and cut-off of current through said transistor for respectively producing said leading edge and trailing edge switching impulses.

No references cited.